United States Patent [19]
Billington, III

[11] Patent Number: 5,437,572
[45] Date of Patent: Aug. 1, 1995

[54] METHOD AND APPARATUS FOR DEBONING MEAT

[75] Inventor: Charles J. Billington, III, Modesto, Calif.

[73] Assignee: Billington Welding & Manufacturing, Inc., Modesto, Calif.

[21] Appl. No.: 143,917

[22] Filed: Oct. 27, 1993

[51] Int. Cl.⁶ .................. A22C 21/00; A22C 17/04
[52] U.S. Cl. .................... 452/136; 452/135; 452/166
[58] Field of Search ............... 452/136, 135, 138, 166

[56] References Cited

U.S. PATENT DOCUMENTS

| | | | |
|---|---|---|---|
| 2,857,619 | 10/1958 | Massengill | 452/136 |
| 3,216,056 | 11/1965 | Segur | 452/136 |
| 3,233,282 | 2/1966 | Segur | 452/136 |
| 3,510,908 | 5/1970 | Segur et al. | 452/136 |
| 3,672,000 | 6/1972 | Martin et al. | 452/136 |
| 4,216,565 | 8/1980 | Volk et al. | 452/136 |
| 4,380,849 | 4/1983 | Adkison et al. | 452/136 |
| 4,488,332 | 12/1984 | Atteck et al. | 452/136 |
| 4,495,675 | 1/1985 | Hill | 452/136 |
| 4,811,456 | 3/1989 | Heuvel | 452/136 |
| 4,882,810 | 11/1989 | Ostholt et al. | 452/136 |
| 5,090,940 | 2/1992 | Adkison | 452/136 |
| 5,203,736 | 4/1993 | Schulte et al. | 452/136 |
| 5,267,891 | 12/1993 | Cresson et al. | 452/138 |
| 5,277,649 | 1/1994 | Adkison | 452/136 |
| 5,297,984 | 3/1994 | Gagliardi, Jr. | 452/136 |

*Primary Examiner*—Willis Little
*Attorney, Agent, or Firm*—Flehr, Hohbach, Test, Albritton & Herbert

[57] ABSTRACT

An apparatus and method for removing the bone from a piece of meat (21) including a bone severing assembly (27) and a bone removal assembly (34). A piece of meat having an elongated bone (22) with enlarged bone end portions (23, 24) is placed in loading or retaining trough (28) with one enlarged end (24) extending through an alignment aperture (29). Cutting blade cylinders (56, 57) drive cutting blades (51, 52) which sever enlarged end (24) from the bone. The piece of meat with a severed end (21a) is then placed in second loading or retaining trough (36), where collet assembly (72) is brought into snug engagement around the bone (22). Exposed enlarged bone end (23) is gripped by jaws (93, 94). Extractor cylinder (107) retracts jaws (93, 94), pulling the bone (22) through the collet assembly (72) to remove the meat over the severed end (33) of the bone to leave a meat fillet (21b).

11 Claims, 4 Drawing Sheets

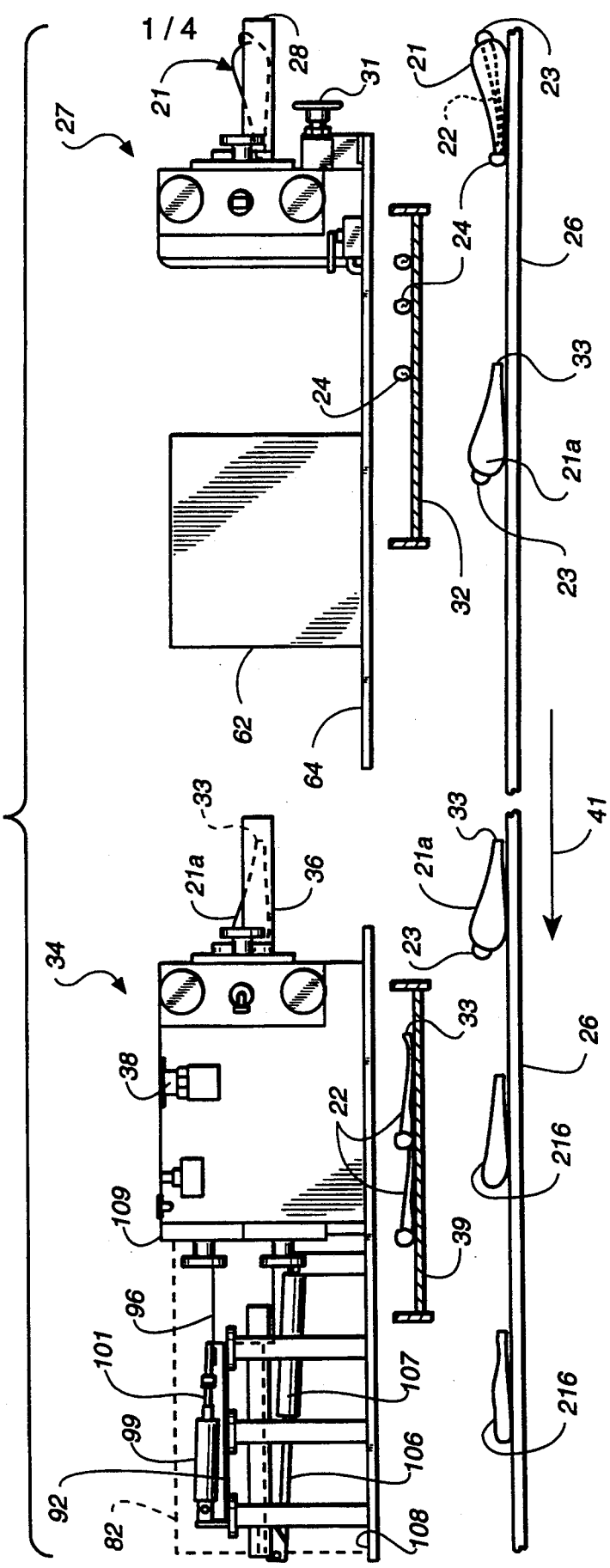
FIG._1

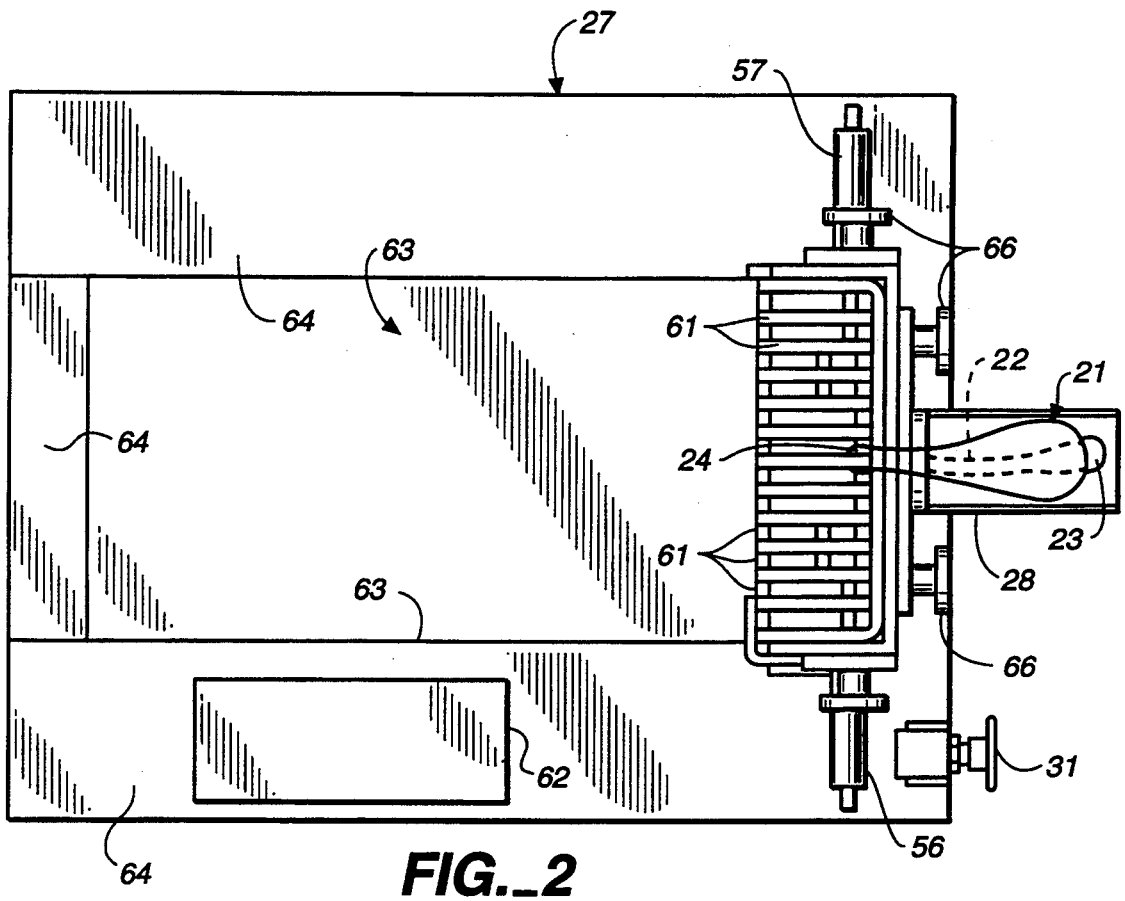
FIG._2
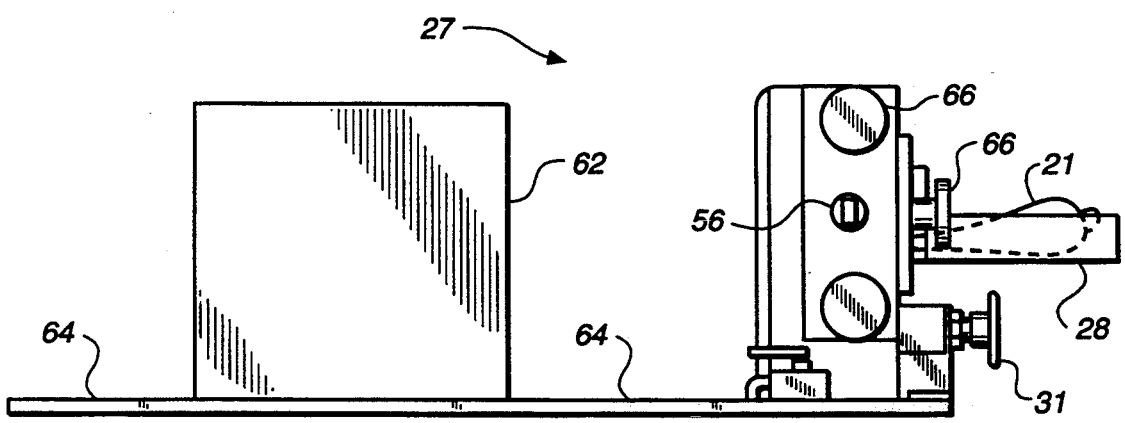
FIG._3

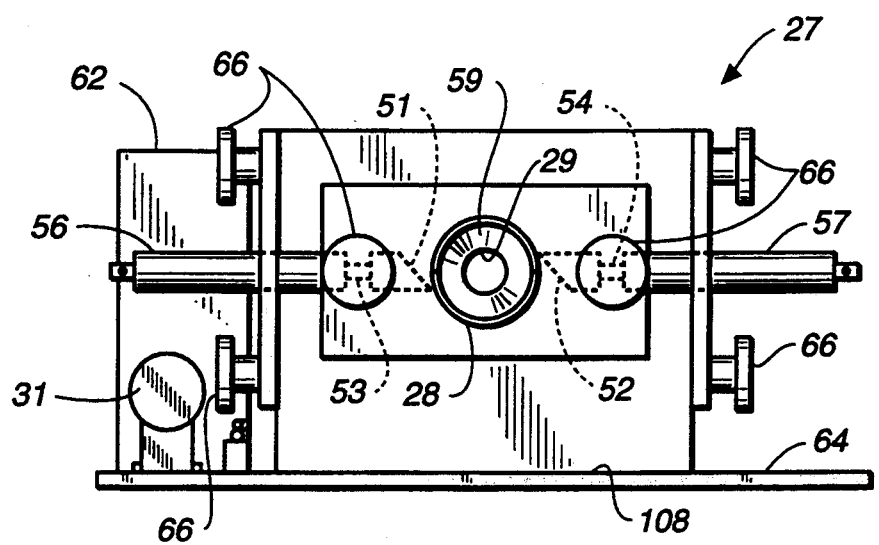
FIG._4
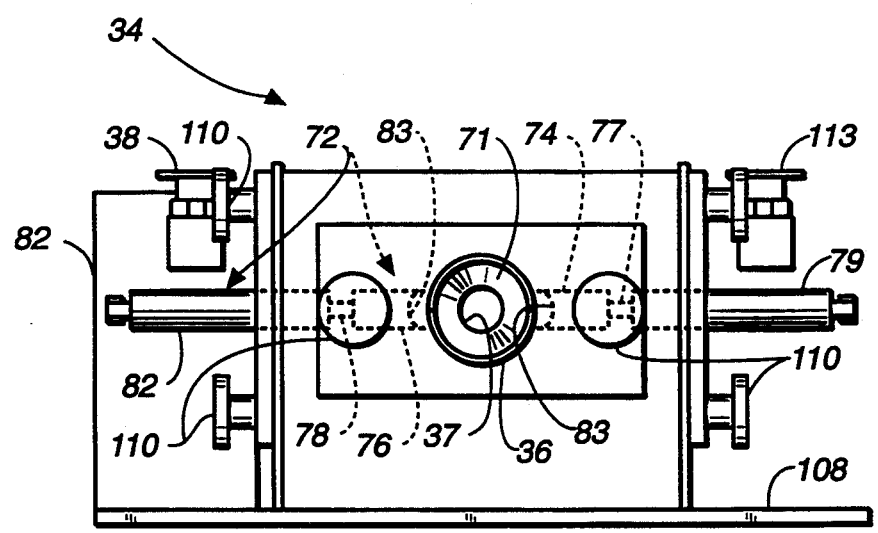
FIG._7

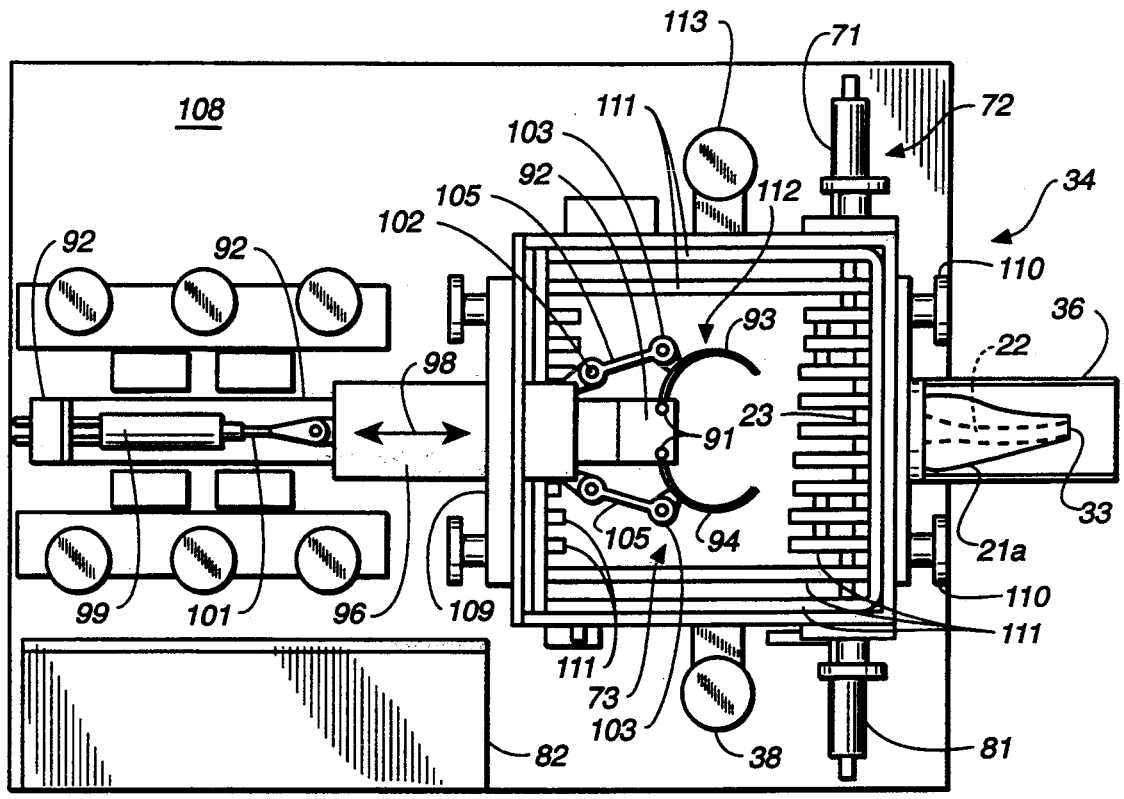
FIG._5
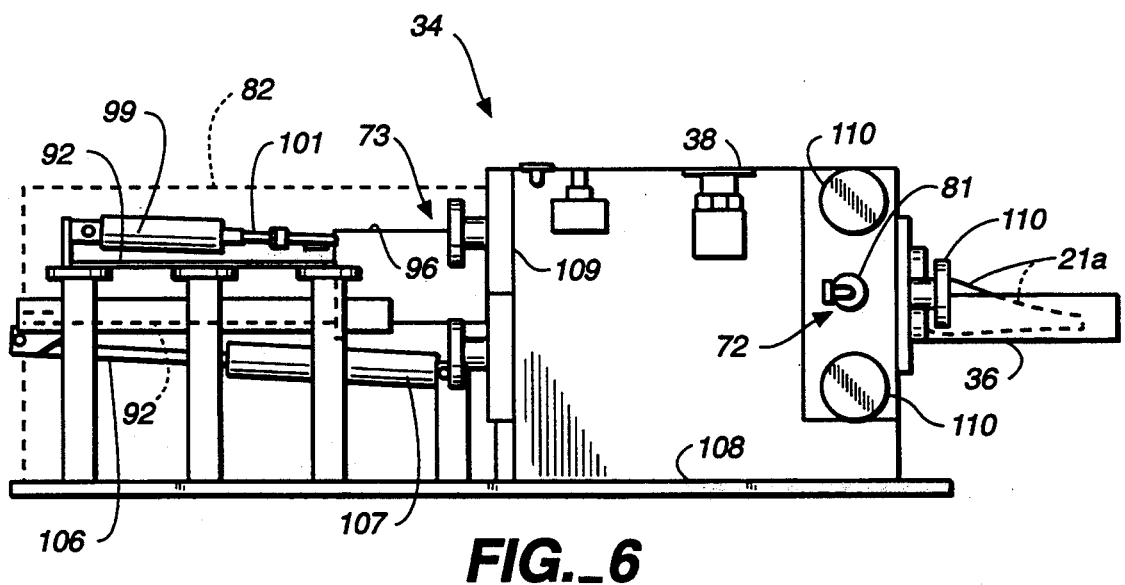
FIG._6

METHOD AND APPARATUS FOR DEBONING MEAT

TECHNICAL FIELD

This invention relates generally to a method and apparatus for removing the bones from meat having an elongated bone with knuckles or enlarged bone portions proximate each end of said elongated bone. More particularly, this invention relates to a method and apparatus for removing the bones from poultry limbs.

BACKGROUND ART

Prior to the delivery of many products to consumers, poultry commonly is divided mechanically into several components attractive for consumers, or practical for further processing or inclusion in other food products. Accordingly, it is an increasingly common procedure to remove the bone from certain pieces of poultry, again either for enhanced consumer appeal or inclusion in other food products. It is desirable that this bone removal process obtain a high efficiency separation of meat from bone, while maintaining a high quality fillet. Although many efforts have been made in this field for mechanically separating bone and flesh, the results until now are often less satisfactory than hand-work.

Conventional techniques for manual deboning require using a knife to make an initial longitudinal slit through meat followed by a latterly outward tearing motion with the hands. Whereas hand-work provides high quality fillets and enables a highly efficient removal of flesh from bone, the hand-work is labor intensive and expensive. Also, the working conditions are detrimental to the health and safety of the operators, and even hinder the quality of meat obtained. Since the working conditions include a refrigerated environment and the use of knives, the concern for worker safety mandates that the operators wear heavy, protective, steel mesh gloves, which diminish the tactile sensitivity of the operators, and work quality suffers. Removal of the gloves to enhance work quality necessarily entails risk of injury through exposure to cold and to cutting blades.

In contrast to the manual removal of the bone which leads to high quality deboned fillet pieces at a relatively high labor expense, the automatic removal with the known machines has many disadvantages and a small gain.

Mechanical deboning apparatus are know in the patent literature, but no widely used in the industry. U.S. Pat. Nos. 5,090,940, 4,882,810 and 3,510,908 disclose devices for separating the meat from certain types of bones of animals, such as poultry leg bones or ungulate leg bones and the like. These known devices generally apply opposing forces to the flesh and to the bone components of the piece to be deboned. In some devices, the strategy employed is to fix the meat component, and then to physically grasp and pull out the bone. Other known devices utilize a strategy of physically grasping the bone, and then using a separate component such as a rigid or semi-rigid orifice, or blades biased against the bone to scrape or strip the flesh away from the bone.

In all these known devices, the bone is physically grasped by some component of the device. In some cases, this is done to keep the bone from moving with the flesh as the device strips the meat away from the fixed bone. In other devices, the grasped bone is subsequently pulled away from the further immobilized meat component. This introduces a further difficulty presented by these devices, in that often a deteriorated fillet is obtained, and the joint connective tissue thereof remains connected to the fillet. Therefore, the joint connective tissue has be removed in a separate operation step.

U.S. Pat. No. 4,380,849 discloses an apparatus for removing the meat from poultry drum sticks. In this device, components are variously arrayed to grasp the small end of a turkey drum stick bone, hold the flesh component of the drum stick, and score the drum stick about the base of the small end with rotating knives in order to loosen the meat from the tendons, gristle, and the other slender elongated cartilage tissues found at the lower end of the poultry drum sticks. Finally, the bone is pulled away from the immobilized meat. A disadvantage of this known device is that the rotating knife mechanism is relatively complex, with multiple moving parts each subject to malfunction. Moreover, the fillet is pulled inside out during the stripping process and must be returned to its natural state if sold directly to consumers.

Automatically separating raw flesh or meat from a piece of meat having an elongated bone with a knuckle or enlarged ends, therefore, poses certain distinct problems. However, once removed, the meat can be cooked or processed alone while avoiding the inefficiency of cooking or further processing the bone. Also, the separated bone can be processed further to make bone meal or other byproducts.

Accordingly, it is the object of the invention to provide an apparatus and method for separating meat from a bone of a poultry limb or the like by which high quality fillets can be obtained which are fee from non-meat particles, and where a minimum of non-usable meat remains attached to the bone.

It is a further object of the present invention to provide a method and apparatus for producing high quality fillets with the joint and other connective tissue removed from the meat.

A further object of the invention is to provide a method and apparatus wherein a high quality fillet is efficiently separated from an elongated bone, with an apparatus having a minimum of moving parts, increased durability and a lower maintenance requirement.

It is still a further object of the present invention to provide a method and apparatus for separating a high quality fillet from an elongated bone with enlarged end portions which provides greatly enhanced safety for operating personnel.

The apparatus and method of the present invention has other objects and features of advantage which will become apparent from and are set forth in more detail in the description of the Best Mode of Carrying Out the Invention and the accompanying drawing.

Disclosure of the Invention

The present invention includes a method of removing the bone from a piece of meat having an elongated bone extending therein and having enlarged bone portions, such as knuckles or joints, proximate opposite ends. The method comprises the steps of severing one of the enlarged bone portions from the bone to create a severed end, and stripping the meat from the bone by relative displacement of the meat and the bone to remove the meat from the bone over the severed end of the bone.

The stripping step of the present invention is accomplished by moving one of a stripping assembly and the end of the bone opposite the severed end in opposite directions, and the bone engaging step is accomplished by engaging the meat with a stripping assembly formed to define an orifice dimensioned to snugly receive the bone therein.

In another aspect of the present invention, an apparatus is provided for removing an elongated bone having enlarged bone portions proximate opposite ends from a piece of meat. The apparatus comprises, briefly, a bone severing cutter assembly mounted for movement between a position for receiving a piece of meat for severing and a position for cutting through the bone proximate one of the enlarged bone portions while the piece of meat is retained in the cutter assembly. After severing, a meat stripping assembly which is mounted proximate a meat retaining assembly, is used to strip substantially all meat away from the bone upon relative displacement of the retaining assembly and the stripping assembly, to remove the meat from the bone over the severed end.

BRIEF DESCRIPTION OF THE DRAWINGS

FIG. 1 is a schematic, side elevation view of a semi-automated assembly line illustrating the deboning apparatus and method of the present invention.

FIG. 2 is a top plan view of a bone severing assembly constructed in accordance with the present invention.

FIG. 3 a side elevation view of the bone severing assembly of FIG. 2.

FIG. 4 is an end elevation view of the bone severing assembly of FIG. 2.

FIG. 5 is a top plan view of a deboning device, partially broken away, constructed in accordance with the present invention.

FIG. 6 is a side elevation view of the deboning device of FIG. 5.

FIG. 7 is an end elevation view of the deboning device of FIG. 5.

BEST MODE OF CARRYING OUT THE INVENTION

The deboning apparatus and method of the present invention is designed primarily for deboning poultry. Poultry deboning presents a particularly difficult problem in that many pieces will have a joint or knuckle at both ends of the bone, making separation of the bone and meat more difficult. The basic design of the invention, however, easily could be adapted by one skilled in the art for deboning operations for other types of meat.

The apparatus and method of the present invention separates the bone from a piece of meat having an elongated bone extending therein and having enlarged bone portions, such as knuckles or joints, proximate opposite ends of the bone. First, one of the enlarged bone portions is severed from the bone to create a severed end, and thereafter the meat is separated from the bone by pushing or pulling the bone relative to the meat until the meat is removed or stripped from the bone over the severed end. The step of severing an enlarged bone joint eliminates the problem of meat being difficult to pull over the enlarged end bone portions during the deboning operation.

While the present invention will be described with reference to a few specific embodiments, the description is illustrative of the invention and is not to be construed as limiting the invention. Various modifications of the present invention can be made to the preferred embodiments by those skilled in the art without departing from the true spirit and scope to the invention as defined by the appended claims. It will be noted here that for a better understanding, like components are designated by like reference numerals throughout the various figure.

It also is note that the embodiment illustrated in the drawing is only semi-automated, that is, the bone is severed in one apparatus and the meat stripped in another. It will be understood, however, that the bone cutting device of FIGS. 2–4 can be combined in one apparatus with the meat stripping apparatus of FIGS. 5–7 and arranged such that the bone cutting device can sever one enlarged end portion of the bone, while the meat stripping device can grip and pull the opposite enlarged end of the bone without any additional manual handling steps necessary. An auto-feeder, for example, an intermittent motion conveyor, could be used to transport troughs retaining pieces of meat to be deboned between the cutting assembly and the stripping assembly. Thus, fully automated deboning can be accomplished using the method and apparatus of the present invention.

Referring now to FIG. 1, the deboning method of the present invention is initiated by placing a piece of meat 21 in a meat receiving and retaining trough 28. The piece of meat includes an elongated bone 22 with enlarged bone portions 23 and 24 proximate the bone ends, as for example, are present in a poultry leg or thigh. As illustrated in FIG. 1, poultry pieces can be placed on a conveyor 26 for delivery to a bone severing station having a bone severing apparatus, generally designated 27. Pieces 21 are preferably pretreated prior the bone severing station to expose both end joints 23 and 24. For a leg, the small knuckle 24 usually is exposed, and an operator need only push the meat back from large joint or knuckle 23.

In the embodiment of the present invention illustrated in the drawing, an operator at a bone severing station picks up piece of meat 21 from conveyor 26 and places the meat in a meat retaining assembly or loading trough 28. The piece of meat is placed in loading trough 28 with one enlarged end, preferably small joint 24, inserted through alignment aperture 29 (FIG. 4). After piece of meat 21 is properly aligned in loading trough 28 with joint 24 advanced past the bone severing blades, actuating switch 31 can be depressed, and opposed cutting blades 51 and 52 will sever joint 24 from the remainder of bone 22, in a manner described in more detail below.

Severed joint 24 drops through opening 63 (FIG. 2) severing apparatus 27 and onto a bone joint conveyor 32 (FIG. 1) to be conveyed to a bone meal processing apparatus, not shown. The operator can remove piece of meat 21a, having a severed end 33, from trough 28 and place the same on conveyor 26 for conveying to a deboning station. Preferably, the operator reverses the orientation of the piece of meat 21a from that of piece 21 so that the next operator will have joint 23 oriented for gripping in the deboning device, generally designated 34.

In the deboning method of the present invention, the operator at the deboning station places piece of meat 21a with one severed end 33 in a loading trough 36. Meat 21a is placed in trough 36 with its remaining enlarged end 23 extending out through an alignment aperture 37 (FIG. 7) by a distance enabling gripping of joint 23. After meat 21a is properly aligned in said loading trough 36, actuating switch 38 can be depressed and joint 23 will be gripped and the meat and bone displaced relative to each other so that the meat is removed or stripped over severed end 33 of bone 22. As shown in the drawing, meat 21a is retained in trough 36 and bone 22 is pulled away from the trough to remove the meat from the bone by pulling the bone out of the meat.

As was the case for bone severing device 27, bone 22 with its severed end 33 can be dropped down through an opening 112 (FIG. 5) in deboning apparatus 34 onto a conveyor 39 (FIG. 1) for conveying of the bone to a bone meal apparatus or waste container. The meat fillet 21b is left in trough 36 and can be placed on conveyor 26 by the operator for conveying in the direction of arrow 41 to a packaging apparatus, not shown.

Severing of one of joints 23 and 24 prior to stripping the meat from bone 22 greatly enhances the ease with which the bone can be removed from the meat. Moreover, meat fillet 21b is not turned inside-out by deboning or stripping device 34.

Referring now to FIGS. 2–4, the details of construction of one possible bone shearing or severing apparatus can be described. It will be understood, however, that numerous other embodiments of bone severing device 27 are suitable for use in practicing the method of the present invention.

Bone severing assembly 27 includes blade means movably mounted to be selectively brought into cutting engagement with bone 22. In this embodiment, a pair of blades 51 and 52 (FIG. 4) are mounted to movable pistons 53 and 54 of pneumatic cylinders 56 and 57.

The poultry piece to be deboned is placed in alignment tray 28 and urged to the left in FIGS. 2 and 3 until joint 24 passes through opening 29 in frusto-conical alignment member 59. Meat 21 is advanced until knuckle or joint 24 can be seen through safety grate 61 (FIG. 2) to be beyond alignment cone 59 and thus in position to be severed. Blades 51 and 52 preferably are positioned immediately adjacent cone-shaped alignment member 59 so that the shearing of bone 22 will take place proximate opening 29.

Once properly positioned, the operator depressed switch or actuator 31, which is coupled to pneumatic controls 62 that, in turn, are pneumatically coupled to cylinders 56 and 57. The shearing blades close on bone 22 and sever joint 24 from the bone. The severed joint falls down through opening 63 in base 64 and onto bone conveyor 32 (FIG. 1).

In order to facilitate cleaning of bone shearing device 27, quick knock-down knobs 66 can be provided to allow disassembly of various components surrounding blades 51 and 52.

While a single loading trough 28 is illustrated, it also will be understood that a series of movable troughs in an intermittent motion magazine or carousel also could be used to sequentially position pieces of meat 21 between blades 51 and 52 for severing of one of joints 23 and 24.

FIGS. 5–7 illustrate the details of construction of one embodiment of a bone removing assembly 34 suitable for use in practicing the method of the present invention.

The piece of meat 21a, having severed bone end 33, is placed in loading trough 36 and advanced toward opening 37 in frusto-conical alignment member 71 (FIG. 7) until joint or knuckle 23 is positioned through opening 37 by an amount sufficient to allow joint 23 to be gripped by a collet assembly, generally designated 72, and a gripper or jaw assembly, generally designated 73. Alignment member 71 tapers inwardly toward the jaws and has an opening 37 which is large enough to receive joint 23 therethrough, but small enough to resist passage therebeyond of the bulk of meat on bone 22. Alignment member 71, however, preferably does not act as a stripping device. Instead, it is preferable that meat removal or stripping collet assembly 72 perform that function.

As best may be seen in FIG. 7, collet assembly 72 includes a pair of opposed bone engaging stripping members 74 and 76 mounted to movable pistons 77 and 78. Pneumatically actuated cylinders 79 and 81 are used to drive pistons 76 and 77 toward each other and are controlled at control panel 82, which provides the pneumatic controls for assembly 34. Opposed surfaces 83 of collet members 74 and 76 are preferably arcuate so that they can snugly engage around bone 22 inwardly of joint end 23. Surfaces 83 are preferably relatively thin but do not have sharpened edges. They function to clamp around bone 22 so as to strip the meat therefrom.

Relative displacement of the meat and bone is produced by jaw assembly 73 which is movable to grip joint 23 and pull the bone away from meat-stripping collet members 74 and 76 so that the meat is removed over severed end 33 of bone 22.

Mounted for pivotal movement about pivot pins 91 are a pair of arcuate jaw members 93 and 94. Pivot pins 91 couple an inner end of jaws 93 and 94 to an elongated guide member 92 which has a jaw actuator block 96 slidably mounted thereon. Jaw actuator arms 105 are pivoted at 102 to guide block 96 and again are pivoted at 103 to jaw members 93 and 94. As can be seen from FIG. 4, jaw members 93 and 94 have a relatively thin dimension along bone 22 and are arcuate to enable gripping of bone 22 immediately behind joint 23 and in front of stripping members 74 and 75. Jaws 93 and 94 also may have arcuate, opposed, bone gripping surfaces which receive and grip the sides of bone 22 in a manner similar to stripping surfaces 83.

In order to effect gripping behind knuckle or joint 23, a pneumatic cylinder 99 and piston 101 are coupled to actuator block 96 to drive the same, as controlled by control panel 2, along guide member 92, as shown by arrows 98.

Finally, an extractor piston 106 (FIG. 6) and cylinder 107 are coupled to guide member 92 and base 108 to enable guide member 92 to be reciprocated relative to vertical guide wall 109, and quick-release knobs 110 are provided to enable access to the collet and jaws for cleaning.

In operation, therefore, bone removal assembly 34 works as follows. The operator places piece 21a of meat having severed end 33 in trough 36 with knuckle or joint 23 extending beyond conical alignment member 71, as viewed by the operator through safety gate 111. Actuator switch 38 is then depressed and cylinders 79 and 81 close collet members 74 and 76 around bone 22 proximate joint 23. Preferably, cylinders 79 and 81 yieldably urge members 74 and 76 firmly against bone 22 so as to cause the collet to follow any irregularities in the bone as it is pulled through collet assembly 72.

For purposes of clarity of illustration, gripping jaws 93 and 94 are shown in an open position but displaced away from knuckle 23 and alignment cone 71. In the preferred process, however, jaws 93 and 94 are in the open position to receive knuckle 23, but piston 106 is retracted in cylinder 107 at the start of the process so that jaws 93 and 94 are immediately adjacent alignment cone 71.

The next step is for jaw actuating cylinder 99 to be pressurized to extend piston 101 toward trough 38. This causes actuator block 96 to slide toward trough 38 on guide member 92. Arms 105 are pivoted at 102 and 103 and jaws 93 and 94 pivot about pins 91 and grip bone joint 23 in front of collet members 74 and 76. Bone 22 is now firmly gripped by jaws 93 and 94 and by collet members 74 and 76.

Now, piston 106 is displaced in a direction away from trough 38 by cylinder 107 to the position shown in FIGS. 5 and 6, only with the jaws closed, and the entire assembly of actuator 96, guide member 92 and jaws 93 and 94 are displaced to the left in FIGS. 5 and 6 relative to guide wall 109 to pull bone 22 out through collet member 74 and 76. This removes the meat 21b from bone 22 and it remains in trough 36.

Next, jaws 93 and 94 are opened by jaw actuator cylinder 99 to drop bone 22 through opening 112 in base 108 of the bone removal apparatus, and extractor cylinder 106 is used to return jaw assembly 73 to a position proximate alignment cone 71 while fillet 21b is removed from trough 36 and a new piece of meat 21a placed in the trough. The extracted bone is taken by conveyor 39 (FIG. 1) to bone meal apparatus or a waste receptacle, and the operator removes deboned fillet 21b from trough 36 and places the same on conveyor 26 for packaging.

Bone removal apparatus 34 also preferably includes an emergency stop switch 113 which enables the operator to stop the bone removal process if jamming or abnormal operation is observed.

As described in connection with severing apparatus 27, bone removal apparatus 34 can be feed by a multiple trough magazine or carousel. Moreover, one can feed both severing apparatus 27 and bone removal apparatus 34 by a common trough magazine or carousel in which severing occurs at one end of the trough and bone removal occurs by gripping the joint at the other end of the trough.

As is common to the food processing industry, most components of the present apparatus are desirably formed from stainless steel to facilitate cleaning. While pneumatic controls are favored, it will be understood that hydraulic and mechanical drives, with electronic controllers, for both the severing assembly and bone removal assembly can be employed.

What is claimed is:

1. A process for removing the bone from a piece of meat having an elongated bone extending therein, said bone further having enlarged bone portions proximate opposite ends thereof, comprising the steps of:
    severing one of said enlarged bone portions from said bone by cutting through said bone proximate said one enlarged portion to create a severed end; and
    removing said meat from said bone by relative displacement of said meat and said bone to remove meat from said bone over said severed end.

2. The process for removing the bone from a piece of meat having an elongated bone extending therein, said bone further having enlarged bone portions proximate opposite ends thereof, comprising the steps of:
    severing one of said enlarged bone portions from said bone to create a severed end;
    engaging said meat with a stripping assembly prior to removing said meat from said bone;
    gripping said bone by an enlarged bone portion opposite said severed end prior to removing said meat from said bone; and
    removing said meat from said bone by moving one of said stripping assembly and said bone relative to the other to remove said meat from said bone over said severed end.

3. The process as defined in claim 2 wherein,
    said engaging step is accomplished by engaging said meat with a stripping member having an orifice dimensioned to snugly receive said bone therein; and
    said removing step is accomplished by displacement of said bone.

4. The process as defined in claim 1 wherein,
    said severing step is accomplished by severing said bone immediately proximate said one of said enlarged bone portions.

5. The process as defined in claim 4 wherein,
    said severing step is accomplished by severing a smaller of said enlarged bone portions.

6. The process as defined in claim 2, and the step of:
    prior to said removing step, moving meat on said bone away from the enlarged bone portion opposite said one of said enlarged bone portions to be severed by an amount sufficient for gripping during said removing step.

7. The process as defined in claim 2 wherein,
    prior to said severing step, exposing both of said enlarged bone portions sufficiently to enable one of severing and gripping thereof.

8. An apparatus for removing the bone from a piece of meat having an elongated bone extending therein, said bone having enlarged bone portions proximate opposite ends, comprising:
    a retaining assembly formed to receive said piece of meat therein and to orient said piece of meat in a predetermined orientation;
    a bone severing assembly mounted proximate said retaining assembly, said bone severing assembly including a blade mounted for movement between a retracted position and a bone cutting position for cutting through said bone proximate one of said enlarged bone portions while said piece of meat is retained in said retaining assembly to produce a severed end of said bone; and
    a meat stripping assembly mounted proximate said bone severing assembly and formed to strip substantially all mean on said bone away from said bone by relative displacement of said stripping assembly and said bone in a direction removing said meat over said severed end.

9. The apparatus as defined in claim 8 wherein,
    said stripping assembly further includes a bone gripping assembly formed to grasp said bone at the enlarged bone portion opposing said severed end.

10. The apparatus as defined in claim 9 wherein,
    said stripping assembly includes a movable stripping collet assembly formed to be brought into engagement with said bone proximate said enlarged bone portion opposite said severed end.

11. The apparatus as defined in claim 10 wherein,
    said gripping assembly is mounted for movement relative to said collet assembly to pull said one through said collet assembly and thereby strip said meat from said bone.

* * * * *

UNITED STATES PATENT AND TRADEMARK OFFICE
CERTIFICATE OF CORRECTION

PATENT NO. : 5,437,572

DATED : August 1, 1995

INVENTOR(S) : Billington, III

It is certified that error appears in the above-indentified patent and that said Letters Patent is hereby corrected as shown below:

Column 1, line 50, delete "no" and insert therefor --not--.

Column 4, line 7, delete "figure" and insert therefor --figures--.

Column 4, line 8, delete "note" and insert therefor --noted--.

Column 6, line 44, delete "2" and insert therefor --82--.

Column 7, line 35, delete "feed" and insert therefor --fed--.

Claim 8, column 8, line 48, delete "mean" and insert therefor --meat--.

Claim 11, Col. 8, line 64, delete "one" and insert therefor --bone--.

Signed and Sealed this

Thirty-first Day of October 1995

Attest:

BRUCE LEHMAN

Attesting Officer

Commissioner of Patents and Trademarks